United States Patent
Sameshima et al.

(10) Patent No.: US 6,500,368 B1
(45) Date of Patent: Dec. 31, 2002

(54) POLYOLEFIN SYNTHETIC RESIN IN-MOLD FOAM MOLDING METHOD

(75) Inventors: Masahiko Sameshima, Settsu (JP); Yoshiyuki Kobayashi, Nara (JP); Kenji Yamaguchi, Osaka (JP)

(73) Assignee: Kaneka Corporation, Osaka (JP)

( * ) Notice: Subject to any disclaimer, the term of this patent is extended or adjusted under 35 U.S.C. 154(b) by 104 days.

(21) Appl. No.: 09/712,163

(22) Filed: Nov. 15, 2000

(30) Foreign Application Priority Data

Dec. 29, 1999 (JP) .......................................... 11-377360

(51) Int. Cl.[7] .............................................. B29C 44/02
(52) U.S. Cl. ................ 264/40.6; 264/51; 264/DIG. 15; 425/143
(58) Field of Search ............................... 264/40.1, 45.4, 264/51, 40.6, DIG. 15; 425/149, 143

(56) References Cited

U.S. PATENT DOCUMENTS

| | | | |
|---|---|---|---|
| 3,935,044 A | * | 1/1976 | Daly .......................... 264/45.4 |
| 4,557,881 A | * | 12/1985 | Rabutski ...................... 425/149 |
| 4,693,856 A | * | 9/1987 | Rubens et al. .............. 264/45.4 |
| 4,800,050 A | * | 1/1989 | Hahn et al. ................. 264/40.1 |
| 5,391,337 A | * | 2/1995 | Kearney et al. .............. 264/51 |
| 6,034,144 A | * | 3/2000 | Shioya et al. ................. 521/60 |

* cited by examiner

Primary Examiner—Allan R. Kuhns
(74) Attorney, Agent, or Firm—Armstrong, Westerman & Hattori, LLP

(57) ABSTRACT

Objects of the invention is to provide a practical, novel foam molding apparatus wherein mold surfaces are devoid of air orifices, and to provide an in-mold foam molding apparatus and method for the reduction of cooling time for molded articles. A mold cavity 4 is filled with prefoamed beads comprising a polyolefin synthetic resin; these are heated and fused with steam; and the molded article is cooled, during which cooling process the pressure of the foamed resin against the molds 2, 3 as it is cooled is successively measured by means of a bearing pressure sensor, and when the pressure of the foamed resin against the molds has reached a pressure predetermined for the particular molded article, cooling of the molded article is terminated, the molded article is released from the mold, and the molded article is then set in a fixture to stabilize the shape of the molded article.

13 Claims, 10 Drawing Sheets

(a)

(b)

POLYOLEFIN SYNTHETIC RESIN IN-MOLD FOAM MOLDING METHOD

BACKGROUND OF THE INVENTION

1. Field of the Invention

The present invention relates to an in-mold foam molding method employing prefoamed beads comprising polyolefin synthetic resin, and to in-mold foam molded articles.

2. Description of the Related Art

Existing in-mold foam molding apparatuses for producing molded articles using prefoamed beads comprising thermoplastic synthetic resins include apparatuses comprising a core mold and a cavity mold; filling means for filling the mold cavity formed between these two molds with prefoamed beads; steam feed means for passing steam through the prefoamed beads packed into the mold cavity in order to heat, foam, and fuse the preformed beads; and cooling means for cooling the molded article by spraying cooling water onto the back faces of the core mold and cavity mold. Chambers are defined to the rear of the core mold and of the cavity mold, and the core mold and the cavity mold are provided with air orifices, such as core vents or core vent holes, which communicate with the mold cavity. During the prefoamed bead filling operation, the chambers function as outlet spaces for air entering the mold cavity together with the prefoamed beads; during heating, foaming, and fusing thereof, they function as chambers for supplying steam to the mold cavity; and during cooling, they function as cooling compartments wherein cooling water may be sprayed onto the back faces of the core mold and cavity mold.

The method for molding a molded article using this type of molding apparatus is basically composed of the following four steps.

During the initial filling process, a pressure differential is created between the mold cavity and a starting material tank that contains prefoamed beads, and the prefoamed beads are carried from the starting material tank into the mold cavity on a stream of air so as to fill the mold cavity. Typical filling methods include cracked filling, compression filling, pressurized filling, and the like.

In a subsequent heating/fusing step, steam pressure is caused to act on the chambers, whereupon the prefoamed beads are heated and fused by steam entering the mold cavity via the air orifices. Since air remaining in the spaces between prefoamed beads can make it difficult for the prefoamed beads to fuse, steam is passed through the mold cavity to replace any air remaining in the spaces between prefoamed beads with steam before proceeding with heating/fusing.

In a subsequent cooling step, cooling water is directed onto the backs of the molds in order to cool the molded article. During this process the molded article is cooled indirectly via the molds by cooling water directed onto the molds from the back, and is also cooled directly by cooling water that penetrates into the mold cavity via the air orifices.

In a subsequent mold release step, the molds are parted and the molded article is released. The timing of mold parting is typically set with reference to time elapsed since the cooling water spray commences. When just released from the mold, the molded article has adequate shape retention due to the high vapor pressure and air pressure inside the beads, but with time the steam condenses and the molded article tends to contract. Accordingly, it is desirable that the molded article be adequately cooled, and where there are strict requirements as to the shape and dimensions of a molded article, the molded article may be set in a fixture until shape and dimensions stabilize.

The foam molding method described above is the principal molding method used currently. However, this molding method has a number of drawbacks, such as the following.

(1) To compensate for lower mold strength resulting from the molds being perforated by a multiplicity of air orifices, mold wall thickness in molds consisting of aluminum alloys must be of the order of 8–12 mm, for example. However, this has the effect of increasing the heat capacity of the mold, lowering thermal efficiency during heating/cooling so that the rate of temperature rise or temperature drop is slower, resulting in lower precision of control.

(2) Typically, a pair of molds is provided with some 2000 to 4000 air orifices, so the process of making the orifices is complicated and results in higher fabrication costs. Since the core vents are installed by hand in mounting orifices provided in the mold, the operation is quite complicated and damage to mold surfaces is unavoidable, thus requiring a retouching operation.

(3) Since clogging of air orifices such as core vents or core vent holes by scale or the like can result in heating defects, mold release defects, or cooling defects, the core vents must be replaced or periodically subjected to cleaning with high pressure water or to some other maintenance procedure.

(4) Since air orifices leave marks on foam molding surfaces, the visual appeal of molded articles suffers, and when the exterior surface is subjected to printing or the like, air orifice marks are an obstacle to attractive printing.

(5) Since the foam molded article is cooled by spraying cooling water into the chamber after molding, water infiltrates into the molding cavity through the air orifices, resulting in water content of about 6–10% in the molded article, necessitating a drying process. Further, since cooling water comes into direct contact with the molded article, cooling water quality must be controlled in order to produce uncontaminated molded articles.

(6) As all of the prefoamed beads are heated, expanded and fused under the same heating conditions by steam passing from the chamber into the mold cavity, molded articles produced in this way (hereinbelow referred to as isothermal molded articles) develop different surface qualities depending upon the extent of fusion of the beads. Specifically, lower fusion rates are associated with poor surface qualities, whereas higher fusion rates are associated with good surface qualities. For isothermal molded articles, higher bead fusion rates improve physical properties such as the mechanical strength of the molded article, but require longer heating, expansion/fusion times and cooling times, creating the problem of longer molding cycle times overall and reduced throughput.

For such reasons, in the molding technique described earlier, bead fusion rates in molded articles are typically set to 40%–80%, for example, in order to give good surface qualities and assure attractive appearance as well as assuring a fusion rate adequate to assure mechanical strength. However, even where mechanical strength requirements for a molded article are not particularly stringent, the need to assure an attractive appearance requires a moderately high fusion rate, which will result in a correspondingly longer molding cycle time and reduced throughput. Fusion rate as used herein is ascertained by splitting the molded article and observing the condition of the beads on the sectional face, specifically, by measuring the proportion of beads experiencing breakdown of the bead per se, deeming beads having cracking along the bead surface but no bursting of the bead per se to be unfused and deeming beads experiencing bursting of the bead per se into fragments to be fused.

The foam molding process described hereinabove is designed such that air orifices such as core vents and core vent holes are used to deliver steam, air, or other service fluids to the mold cavity or to evacuate same from the mold cavity during production of foam molded articles. However, as noted, the provision of air orifices creates a number of problems.

With the goal of providing a fundamental solution to these problems, the inventors conducted extensive research concerning development of a foam molding process which would employ molds devoid of air orifices, and conducted tests of various kinds. While the goal is a mold "devoid of air orifices," it is of course necessary to provide, in lieu of core vents and core vent holes, some kind of passages for delivering/evacuating steam, air, or other service fluids to and from the mold cavity, which gives rise to the issue of where and how to form same, of the timing and conditions that should be employed in delivering service fluids to such passages, and a host of other issues that need to be addressed.

One such problem is that of a decline in the efficiency of cooling of the molded article. When a mold is devoid of air orifices, cooling water sprayed onto the back face of the mold does not penetrate into the mold cavity, so the molded article is not cooled directly by cooling water but is rather cooled only indirectly via the mold. Thus, cooling efficiency will be lower than with a conventional molding apparatus that produces both direct and indirect cooling, and the time required to cool the molded article will be longer. Another problem, albeit one that is encountered with in-mold foam molding apparatuses whose molds do have air orifices as well, is that if the molded article is released from the mold before adequately cooling, the molded article per se will be soft and lack shape sustaining power, resulting a molded article having poor shape stability and experiencing problems such as deformation. Accordingly, it was considered to be difficult to reducing the molded article cooling time any further.

SUMMARY OF THE INVENTION

It is an object of the present invention to make practical a novel foam molding apparatus wherein the mold surfaces are devoid of air orifices such as core vents and core vent holes, and to provide an in-mold foam molding apparatus and in-mold foam molding method for polyolefin synthetic resins which addresses one of the issues of this novel foam molding technique, namely, reduced cooling time for molded articles.

As a result of exhaustive research concerning ways to reduce cooling time for molded articles, the Applicant noted that even if a molded article is released from the mold before it has adequately cooled and is still soft, the shape of the molded article can nevertheless be stabilized by setting it in a fixture, and arrived at the idea of dramatically shortening cooling time by releasing the molded article from the mold while still soft, but not so soft as to break. The Applicant further arrived at the idea that the timing for mold release can be set accurately and dimensional stability can be greatly improved by conducting a series of measurements of prefoamed bead bearing pressure against the molds and setting the timing of mold release on the basis of the measurements so obtained, and perfected the invention on the basis thereof.

The polyolefin synthetic resin in-mold foam molding method of the first phase of the present invention comprises the steps of filling a mold cavity with prefoamed beads comprising a polyolefin synthetic resin; heating and fusing these with steam; and cooling the molded article; wherein during the cooling process the pressure of the foamed resin against the molds is measured successively by means of a bearing pressure sensor, and when the pressure of the foamed resin against the molds is found to have reached a pressure predetermined for the particular molded article, cooling of the molded article is terminated, the molded article is released from the mold, and the molded article is then set in a fixture to stabilize the shape thereof.

According to this molding method, the released molded article is set in a fixture and held therein for a given time interval, whereby it is possible to stabilize the shape and dimensions of the molded article outside of the mold, thereby assuring adequate dimensional precision of the molded article, while at the same time shortening cooling time by releasing the molded article from the mold while still soft, but not soft enough to break, whereby molding throughput may be improved. As the timing for mold release is determined on the basis of serial measurement of the pressure of the foamed resin against the molds, mold release can timed optimally. In the in-mold foam molding apparatuses commonly used at present, the time elapsed from the outset of cooling is measured using a timer, and once a predetermined time interval has elapsed, cooling is terminated and the molded article is released. However, with such an arrangement mold release timing cannot be adjusted in response to variation in optimal mold release timing due reduced cooling efficiency resulting from variation in prefoamed bead diameter between shots, clogging of core vents, and the like. Accordingly, a rather long cooling time must be provided. According to the present invention, however, the timing for mold release is determined on the basis of foamed resin pressure, making it possible to time mold release in an optimal manner so as to appreciably reduce cooling time and improve dimensional stability of molded articles by controlling variation in molding dimensions between shots.

The molding method of the second phase of the present invention involves terminating cooling of the molded article and releasing the molded article when foamed resin pressure against the molds is within the range 0.02–0.2 MPa. Where foamed resin pressure is less than 0.02 MPa, no appreciable reduction in cooling time is achieved. Above 0.2 MPa the molded article is still too soft and the molded article may split when the molded article is released through ejection by an ejector pin, or the foaming pressure of the prefoamed beads will be so high so that the molded article expands when released, resulting in lower dimensional accuracy of the molded article. Accordingly, resin pressure is preferably set within the range 0.02–0.2 MPa.

The molding method of the third phase of the present invention involves setting the time for which the molded article is set in the fixture to between 5 and 60 minutes. While setting time will differ with prefoamed bead material and molding weight, a relatively large molded article may be imparted stable shape with setting for 15 to 40 minutes.

The molding method of the fourth phase of the present invention involves providing a plurality of fixtures which are cyclically delivered to the molding apparatus by means of a conveyor. With this arrangement, molded articles molded by the molding apparatus can be successively set in the fixtures delivered to the molding apparatus by the conveyor so that the molding process and the molding shape stabilization process may be carried out as a continuous operation.

The molding method of the fifth phase of the present invention employs as molds a core mold and a cavity mold that are devoid of air orifices such as core vents and core vent holes in mold sections that form conspicuous portions on the exterior of a molded article.

With this molded article method, mold sections for mold-ING conspicuous portions on the exterior of molded articles are devoid of air orifices, whereby marks left on molding surfaces by air orifices will be situated in inconspicuous locations on molding surfaces where they do not detract from the attractiveness of the surface of the molded article.

Further, with this molding method, air orifices can be completely or largely dispensed with, whereby it becomes possible to separately control delivery of service fluids to the chamber to the back of the core mold, to the chamber to the back of the cavity mold, and to the mold cavity. By controlling a service fluid, such as steam for example, so as to independently manipulate heating conditions in each compartment, it is possible by means of steam delivered to the two chambers to regulate the surface properties of the prefoamed beads filling the mold cavity in areas thereof contacting the core mold and the cavity mold, while at the same time heating, foaming, and fusing the prefoamed beads in the mold cavity by means of steam delivered to the mold cavity, whereby the rate of fusion of the prefoamed beads may be controlled independently of surface qualities. Thus, the rate of fusion in the interior of a molded article may be held to a low level, reducing molding cycle time while producing a molded article having an attractive surface, thus achieving both good throughput and high product value.

The molding method of the sixth phase of the present invention dispenses completely with air orifices in the two molds. With this arrangement, heating conditions in the three compartments, namely, the chamber to the rear of the core mold, the chamber to the rear of the cavity mold, and the core mold, can be precisely controlled, and the surface of the resultant molded article is free from marks produced by air orifices. The absence of air orifices also prevents cooling water from coming into direct contact with the molded article, thereby allowing the water content of the molded article to be held to a low level, obviating the need for a drying process after mold release, affording uncontaminated molded articles without the need to control cooling water quality, and providing other advantages.

In the molding method of the seventh phase of the present invention, during the process of cooling the molded article, cooling water is sprayed onto the back faces of the two molds by first cooling means in order to cool the molded article indirectly via the molds, and cooling water from outside the mold is sprayed by second cooling means into the mold cavity from cooling water orifices provided to at least one of the molds, whereby the molded article is cooled directly with cooling water.

As noted, eliminating air orifices from the molds means that during the cooling process the molded article is not cooled directly by cooling water, and cooling efficiency drops. According to this invention, however, the molded article can be cooled indirectly via the molds by spraying cooling water onto the back faces of the two molds using first cooling means, while also cooling the molded article directly with cooling water by spraying cooling water into the mold cavity from cooling water orifices provided to at least one of the molds, using second cooling means. Thus, despite the absence of air orifices in the molds, the molded article can be cooled efficiently and the time required to cool the molded article can be appreciably reduced, as well as reducing the amount of cooling water used. Since only the cooling water from the second cooling means comes into contact with the molded article, where it is desired to keep molded articles in an uncontaminated state, it is sufficient to implement control of cooling water quality for the cooling water of the second cooling means only, thereby significantly reducing the costs associated with water treatment.

The molding method of the eighth phase of the present invention involves providing cooling water orifices in proximity to the prefoamed bead filling unit, in proximity to the ejector pin, or both. Like air orifices such as core vents and core vent holes, cooling water orifices in the core mold and/or cavity mold leave marks on the molding surface, so it is preferable for these marks to be situated at inconspicuous locations on the molded article, such as in proximity to the prefoamed bead filling unit, in proximity to the ejector pin, or both.

In the molding method of the ninth phase of the present invention, cooling water is sprayed into the mold cavity through cooling water orifices by the second cooling means some 2 to 30 seconds after the first cooling means commences cooling by spraying cooling water.

When the prefoamed beads filling the mold cavity are subjected to vapor pressure, heated, and the mold cavity is then returned to atmospheric pressure, they expand and fuse together within in mold cavity with no gaps therebetween. If cooling water should be delivered to the mold cavity at this point, the prefoamed beads will harden before expanding adequately, resulting in a molding defect whereby height variation is produced on the molding surface. Since cooling of molded articles requires some time, commencing the cooling process by spraying cooling water on the back faces of the molds only after the prefoamed beads have expanded sufficiently will result in extended cooling time. Accordingly, cooling of the molded article by the first cooling means commences promptly upon completion of the heating process, and 2 to 30 seconds later, once the prefoamed beads have sufficiently expanded, cooling water is delivered to the mold cavity by the second cooling means in order to cool the molded article. This reduces the cooling time dramatically while giving molded articles of good quality.

The molding method of the tenth phase of the present invention involves successively measuring foamed resin pressure against the molds, and when the foamed resin pressure observed subsequent to the start of cooling by the first cooling means reaches a level 0.50 to 0.95 times the foamed resin pressure observed at the conclusion of heating, cooling water is sprayed into the mold cavity by the second cooling means. In the ninth phase of the present invention, the timing for operation of the second cooling means is delayed for some time after the first cooling means has begun to operate. This may be accomplished by making direct measurements of foamed resin pressure in the mold cavity, and when the foamed resin pressure observed subsequent to commencing spraying by the first cooling means reaches a level 0.50 to 0.95 times the foamed resin pressure at observed conclusion of heating, deeming the prefoamed beads to be sufficiently foamed and operating the second cooling means.

In preferred practice, operating time for the second cooling means will be from 2 to 30 seconds, as the eleventh phase of the present invention, and will be equivalent to 3 to 50% of operating time for the first cooling means, as the twelfth phase of the present invention. That is, while it is acceptable to continue to operate the second means until the end of the cooling process, since the cooling water delivered by the second cooling means comes into direct contact with the molded article, it is preferable to set the operating time as taught in the eleventh or twelfth phase of the present invention in order to assure adequate cooling efficiency while preventing shrinkage of the molded article due to over-cooling, to hold down the water content of the molded article, and to prevent contamination of the molded article after mold release.

The in-mold foam molded articles of the thirteenth phase of the present invention are molded into the shape of core for a car bumper by the molding method according to any of the first phase to twelfth phase of the present invention.

Car bumper cores of this kind must have highly accurate dimensions despite their considerable length, and are considered difficult to produce even with the extended cooling times employed in conventional methods. Through the use of the molding method described hereinabove, however, molding may be carried out without any drop in throughput.

DESCRIPTION OF THE PREFERRED EMBODIMENTS

Figure 1:
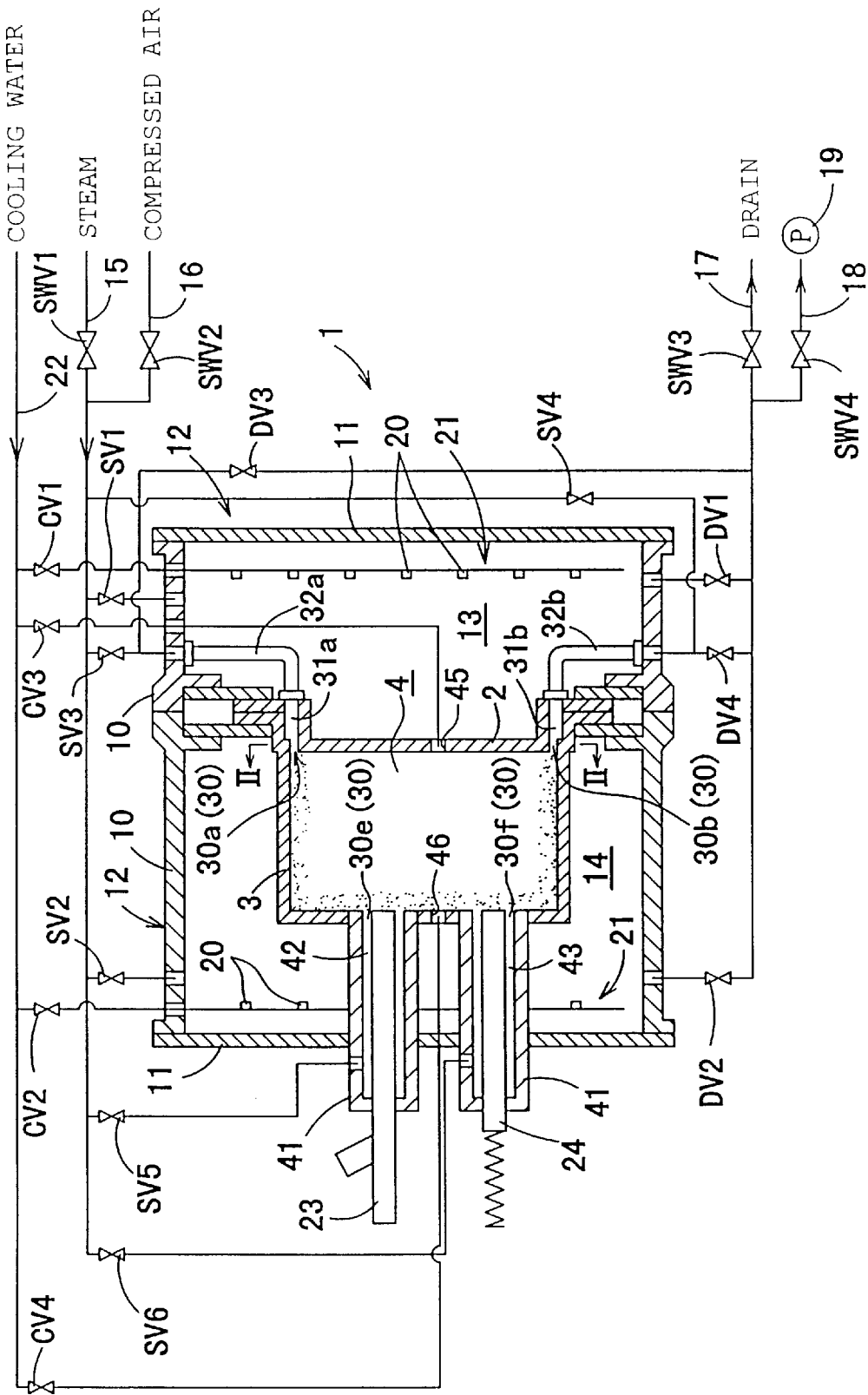
FIG. 1 is a schematic illustration of an in-mold foam molding apparatus in its entirety.

The embodiments of the invention are described hereinbelow making reference to the accompanying drawings.

The description turns first to the prefoamed beads employed in the molding apparatus and molding method of the invention.

Suitable materials for the prefoamed beads include polyolefin synthetic resin materials such as polyethylene resin and polypropylene resins, as well as copolymers of these synthetic resin materials. Specific examples are ethylene-propylene random polypropylene resin, ethylene-propylene block polypropylene resin, homo polypropylene ethylene-propylene-butene random terpolymer, linear low-density polyethylene (LLDPE), crosslinked low-density polyethylene (LDPE), and so on. Prefoamed beads of such polyolefin resins consist of soft materials and have high gas permeability, and so for a given expansion factor they experience significantly more deformation of particle shape than do prefoamed beads of polystyrene resin, making them suitable for use in the invention.

The expansion factor of the prefoamed beads will depend to some extent on the material, but it is appropriately 3 to 90 and preferably 3 to 60. Bead size is appropriately 1 to 10 mm, and preferably 2.0 to 8 mm. Prefoamed beads of polyolefin synthetic resin materials are especially preferred as they consist of soft materials and have high gas permeability, and so for a given expansion factor experience significantly more deformation of particle shape than do prefoamed beads of polystyrene resin, providing improved packing.

More specifically, where prefoamed beads comprising a polyolefin synthetic resin material, for example a polypropylene resin, are used, physical properties are as follows.

Where prefoamed bead cell size is smaller than 100 pm, surface elongation during molding is poor, creating susceptibility to sinkage, resulting in poor appearance of the visible faces. Above 900 $\mu$m, cell diameter tends to become irregular, and surface texture becomes rough due to the large cell size, resulting in poor appearance of the exterior surface. For these reasons, cell diameter is preferably within the range 100–900 $\mu$m, more preferably 150–700 $\mu$m, and most preferably 170–550 $\mu$m.

The expansion factor, while not critical, is preferably on the order of 5 to 60 (increase in foamed bead bulk).

In preferred practice, the DSC second peak ratio will be 8%–60%. DSC second peak ratio refers to the area under the high temperature-end peak as a percentage of the total area under two DSC (differential scanning calorimetry) peaks (a high temperature-end and a high temperature-end) resulting from the crystal melting point of a base resin when the base resin is heated. Where this DSC second peak ratio is below 8%, permissible heating parameters for molding will be rather narrow, and molded articles will tend to shrink and be susceptible to sinkage. Where the ratio exceeds 60%, heating parameters will need to be significantly upped, necessitating a large scale molding unit, which is undesirable from an energy consumption standpoint as well. For these reasons, values ranging from 8–60%, preferably 10–50%, and especially 15–40% are preferred.

Where the percentage of closed cells is less than 65%, molded articles tend to shrink and experience appreciable sinkage, even where heating voltage is upped during molding to bring about fusion of the beads, thereby making it difficult to produce molded articles of the desired quality. Accordingly, values of 65% or above, preferably 75% or above, and especially 85% or above are preferred.

The specific design of the in-mold foam molding apparatus is now described. The in-mold foam molding apparatus which pertains the invention is distinguished by the following three features.

(1) First Feature

The molds are completely or largely devoid of air orifices, and openings for delivering service fluids, such as air for introducing the prefoamed beads or steam for heating and fusion thereof, are located in mold sections used for molding inconspicuous portions of a molded article.

(2) Second Feature

The molds are completely or largely devoid of air orifices, and the design allows a molded article to be cooled directly through pressure injection of cooling water into the mold cavity during cooling of the molded article.

(3) Third Feature

A sensor for making serial measurements of foamed resin pressure against the molds is provided, so that mold release of the molded article may be done with optimal timing; and the released molded article is set in a fixture to stabilize its shape and dimensions.

The first and second elements presume the use of a molding apparatus wherein the molds are completely or largely devoid of air orifices. The third feature may be implemented in a molding apparatus completely or largely devoid of air orifices, or in a molding apparatus of the type widely known in the art, provided with air orifices. The following description takes the example of a molding apparatus completely or largely devoid of air orifices, capable of being furnished with these three features.

Figure 2:
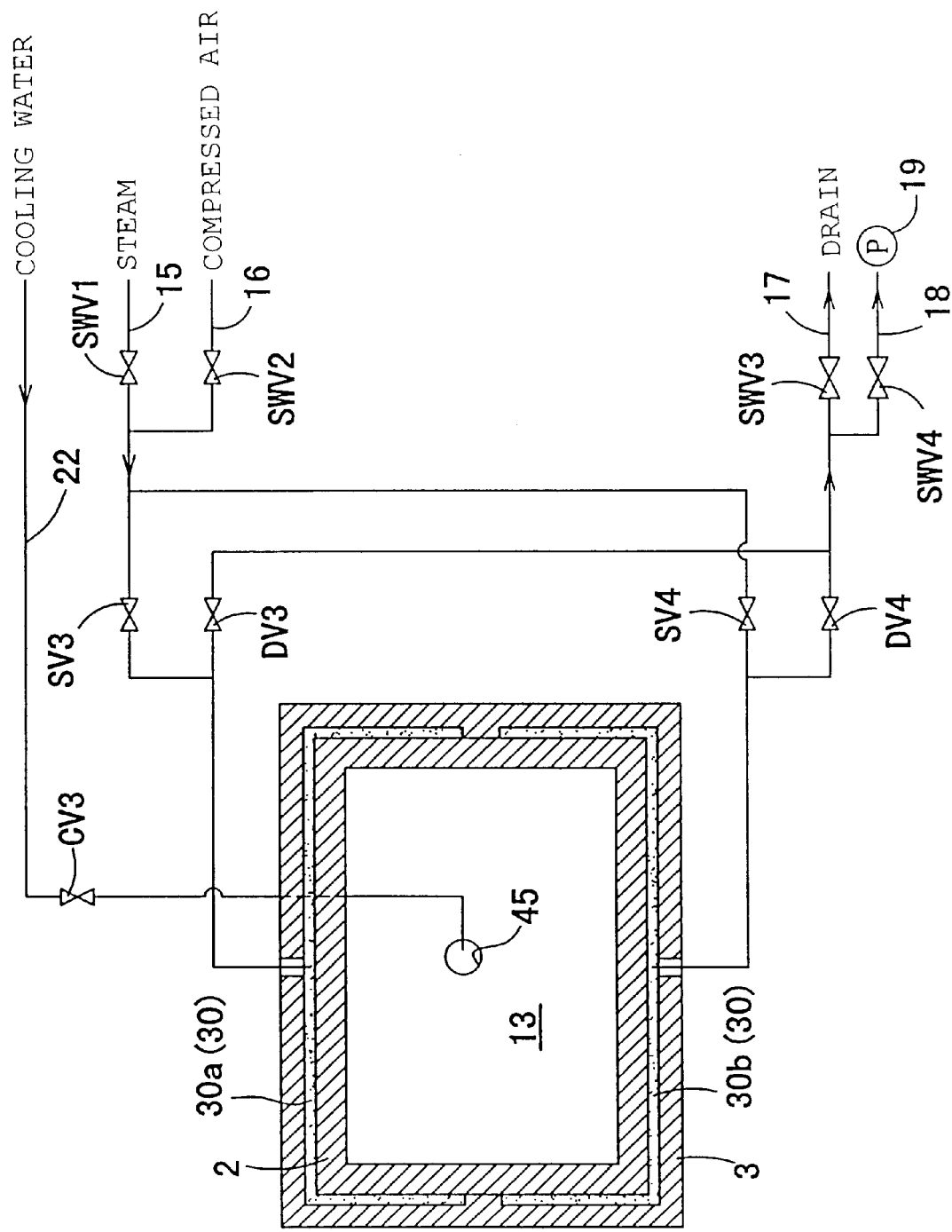
FIG. 2 is a sectional view taken along line II–II in FIG. 1.

Referring to FIGS. 1 and 2, in-mold foam molding apparatus 1 comprises a set of molds composed of a core mold 2 and a cavity mold 3 situated in opposition; bead filling means for filling a mold cavity 4 defined by core mold 2 and cavity mold 3 with prefoamed beads carried on an air stream; pressure reducing means for reducing the pressure in mold cavity 4; compressed air feed means for supplying compressed air to the interior of mold cavity 4; steam feed means for heating and expanding/fusing with steam the prefoamed beads filling mold cavity 4; and first cooling means and second cooling means for cooling the molded article.

Core mold 2 and cavity mold 3 are each attached to a housing 12 having a rim-like frame 10 and a back panel 11, and a first chamber 13 and a second chamber 14 are defined to the rear of core mold 2 and cavity mold 3, respectively.

First chamber 13 and second chamber 14 are respectively coupled to a steam feed line 15 and an air feed line 16 via service valves SV1, SV2 and switching valves SWV1, SWV2, and also respectively coupled to a drain line 17 and a vacuum line 18 (which is hooked up to a vacuum pump 19) via drain valves DV1, DV2 and switching valves SWV3, SWV4. As the first cooling means for cooling the molded article, the first and second chambers 13, 14 are each provided with a nozzle unit 21 having a plurality of nozzles 20 for misting cooling water onto the back faces of core mold 2 and cavity mold 3, the two nozzle units 21 being coupled with a cooling water feed line 22 via cooling water valves CV1, CV2.

The first feature of the in-mold foam molding apparatus which pertains to the invention resides the provision to core mold 2 and cavity mold 3, in mold sections thereof used in molding inconspicuous portions of the molded article, of first openings 30 that communicate with mold cavity 4, these first openings 30 being provided with communicating passages communicating with external service lines 15–18, whereby service fluids (e.g., steam, compressed air, etc.) may be delivered to or vented from mold cavity 4 independently of chambers 13, 14 via a plurality of first openings 30 by operating service valves SV3–SV6, drain valves DV3, DV4, and switching valves SWV1–SWV4. Thus, in contrast to conventional molding apparatuses, core mold 2 and cavity mold 3 are devoid of air orifices such as core vents or core vent holes, so mold cavity 4 and the two chambers 13, 14 constitute independent compartments. While mold cavity 4 and the chambers 13, 14 are preferably isolated from each other in completely gas-tight fashion, the invention also encompasses cases where these compartments can be controlled independently despite provision of a small number of conventional air orifices such as core vents and core vent holes for communication between mold cavity 4 and the chambers 13, 14.

The position of first openings 30 basically takes place under any of three general schemes: the position thereof at or in proximity to the parting line of core mold 2 and cavity mold 3; the position thereof in proximity to portions of peripheral components (e.g., the filling unit 23, ejector pin 24, etc.) lying exposed within mold cavity 4; or a combination of these two.

First, the position of first openings 30 at or in proximity to the parting line of core mold 2 and cavity mold 3 will be described through examples of three types.

(1) Referring to FIGS. 1 and 2, in-mold foam molding apparatus 1 of a first type has first openings 30a, 30b of slit form situated along the parting line of core mold 2 and cavity mold 3 and communicating with mold cavity 4. Communicating passages, namely, inter-mold passages 31a, 31b and internal lines 32a, 32b, provide communication between the first openings 30a, 30b and the external service lines 15–18. Core mold 2 and cavity mold 3 are devoid of conventional air orifices such as core vents and core vent holes, being designed such that when closed, mold cavity 4 is isolated in gas-tight fashion from chambers 13, 14, while first openings 30a, 30b leading to external service lines 15–18 are formed in core mold 2 and cavity mold 3.

With this arrangement, the prefoamed bead preheating/evacuation process and fusing/heating process are conducted as follows, using these first openings 30a, 30b in place of conventional air orifices.

In the preheating/evacuation process, mold cavity 4 may be evacuated directly, conducting evacuation via first opening 30a and first opening 30b, and steam for preheating then supplied directly in the same manner. In the fusing/heating process, steam at fusing temperature may be supplied directly to the prefoamed beads in mold cavity 4 via first opening 30a and first opening 30b in the same manner.

To prevent clogging of first openings 30a, 30b by the prefoamed beads, the width of the mold cavity 4 apertures of first openings 30a, 30b must be smaller than the outside diameter of the prefoamed beads, namely, 1 to 10 mm or smaller in diameter. To eliminate squeeze-out, flash marks, and the like in order to improve the finish of foam molded articles, it is desirable to make aperture width as small as possible; however, if aperture width is too small, excessive resistance to passage of service fluids will result. Accordingly, aperture width of 0.1–1.5 mm is appropriate.

In the present invention, first openings 30a, 30b are appropriately provided along the valley portion of the recess situated at the parting line of the core mold 2 and the cavity mold 3. With this arrangement, as first openings 30a, 30b of slit form are situated in locations corresponding to convex angular ridgeline portions on the exterior of the foam molded article, appearance suffers negligibly even if a slight amount of flash should remain.

Internal lines 32a, 32b ideally consist of copper pipe 4 to 15 mm in diameter.

FIG. 1 depicts a combination of two series of communicating passages, a series of communicating passages comprising a first opening 30a, an inter-mold passage 31a, and an internal line 32a; and a series of communicating passages comprising a first opening 30b, an inter-mold passage 31b, and an internal line 32b. However, the invention is not limited to this arrangement, it being possible to use a combination of three or more series of communicating passages, or a single one only, depending on the size and configuration of the foam molded article.

Where a plurality of first openings 30, for example, a pair of first openings 30a, 30b, is provided, it is preferable to situate these at the parting line between molds 2, 3 located at opposite sides of two facing ends of mold cavity 4, as shown in FIG. 2. While the length of first openings 30a, 30b is not critical, this arrangement affords advantages such as permitting the use of service procedures wherein a service fluid such as steam can be delivered from one first opening to the other first opening after passing through mold cavity 4 (particularly an operation to replace air present between the prefoamed beads in mold cavity 4 with steam); allowing the prefoamed bead heating procedure to be carried out rapidly, and the like.

The advantages of the first type may be summarized as follows.

[1] Since the air orifices such as core vents and core vent holes employed conventionally may be eliminated from molds 2, 3, reduced strength in molds 2, 3 may be prevented, allowing conventional aluminum alloy mold material to be reduced in thickness from 8–12 mm to 4–8 mm. This reduces the heat capacity, improving heating/cooling efficiency, improving the accuracy of temperature control, and reducing materials costs.

[2] The need for processes to produce core vent mounting holes and core vent holes and for a process to install the core vents in the core vent mounting holes is obviated, significantly reducing machining costs and reducing fabrication costs for molds 2, 3.

[3] Heating defects, release defects, and cooling defects due to clogging are eliminated, thereby obviating the need for maintenance operations such as replacement or periodic high pressure washing of the core vents.

[4] Product surfaces are free from marks produced by core vents and core vent holes, thereby improving appearance and eliminating any difficulties in processes such as printing the surface or applying adhesive labels.

[5] Cooling water used in the cooling process does not penetrate into the mold cavity, whereby the water content of products can be held to about 0.5–24% (versus 6–10% in the conventional art), thus obviating the need for a drying process, contributing significantly to shorter cycle time.

[6] The greatest advantage of the invention is the ability to conduct service operations not possible with conventional molds. In conventional practice, in order to subject prefoamed beads to the action of steam or other service fluid, a service fluid coming from a service line must first be made to act on one of the chambers, from whence it can act on the prefoamed beads via air orifices such as core vents and core vent holes. In the present invention, however, the service passages for chambers 13, 14 and mold cavity 4 are separate and independent, whereby service fluids such as pressurized air, steam, decompression air, cooling water, or the like can be made to act directly on mold cavity 4 via first openings 30a, 30b, thus expanding the degree of freedom in service operations.

For example, where it is desired to reduce pressure in mold cavity 4, with conventional molds it is necessary to reduce pressure in both chambers as well, whereas in the present invention, the pressure reduction operation can be performed on mold cavity 4 exclusively, which has a capacity on the order of one-tenth chamber capacity. Advantages include significantly improved control, since, conventionally, response is conducted rapidly.

Further, since chambers 13, 14 and mold cavity 4 constitute independent compartments, heating conditions for each can be controlled independently, whereby the temperatures of the set of molds 2, 3 can be controlled independently through the medium of steam supplied to the chambers 13, 14, allowing the qualities of the molding surfaces contacting molds 2, 3 to be controlled. Fusion of the prefoamed beads can be controlled independently of surface qualities by heating, expanding, and fusing the prefoamed beads filling the mold cavity 4 through the medium of steam supplied to the mold cavity 4. In this way, fusion in the interior of a molded article can be held to a low level, molding cycle time can be shortened, and molded articles with attractive surfaces can be produced, affording both enhanced throughput and product value.

Figure 3:
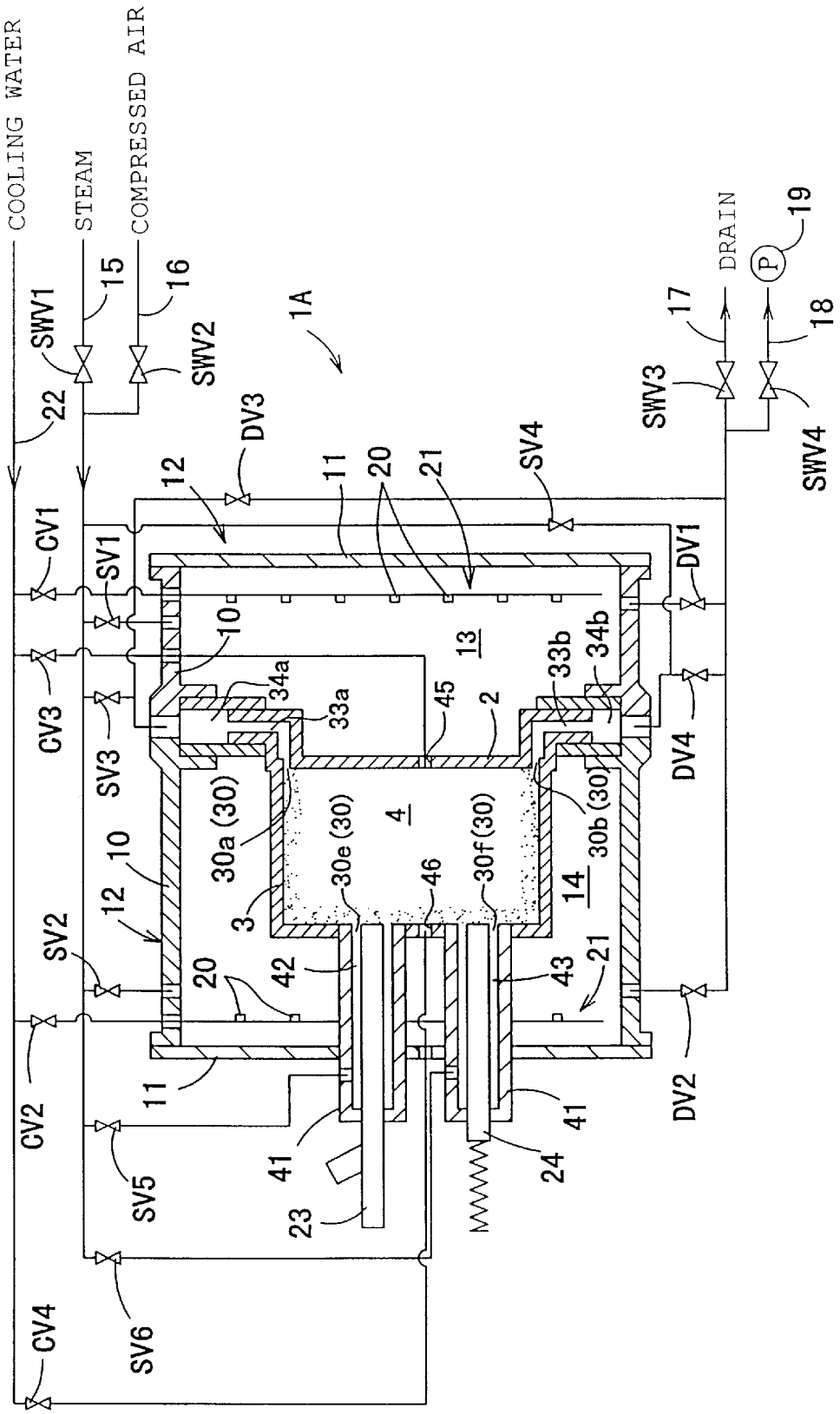
FIG. 3 is a schematic illustration of another in-mold foam molding apparatus in its entirety.

(2) Referring to FIG. 3, in-mold foam molding apparatus 1A of a second type has first openings 30a, 30b of slit form communicating with external service lines 15–18 via communicating passages composed of inter-mold passages 33a, 33b that, with the molds closed, extend outwardly from mold cavity 4 along the parting line of molds 2, 3; and inter-mold passages 34a, 34b enclosed at the parting line of the rim-like frames 10. Other elements are identical to those in the in-mold foam molding apparatus 1 described earlier, and as such are assigned the same symbols and not described in any detail.

In this in-mold foam molding apparatus 1A, molds 2, 3 are devoid of conventional air orifices such as core vents and core vent holes, being designed such that when closed, the mold cavity 4 is isolated in gas-tight fashion from chambers 13, 14, while first openings 30a, 30b and the communicating passages via which these first openings 30a, 30b communicate with service lines 15–18, namely, inter-mold passages 33a, 33b and inter-mold passages 34a, 34b, extend outwardly from mold cavity 4 along the parting line of molds 2, 3 and rim-like frames 10, arranged in a different configuration than in the preceding in-mold foam molding apparatus 1 of the first type.

In the foam molding apparatus 1A depicted in FIG. 3, as in in-mold foam molding apparatus 1, service fluids can be controlled during foam molding, thereby affording advantages [1] to [6] listed earlier. An additional advantage is that internal lines 32a, 32b (which require a pipe installation operation during fabrication) can be dispensed with, thereby holding down the fabrication costs of the foam molding apparatus and obviating the need for maintenance.

Figure 4:
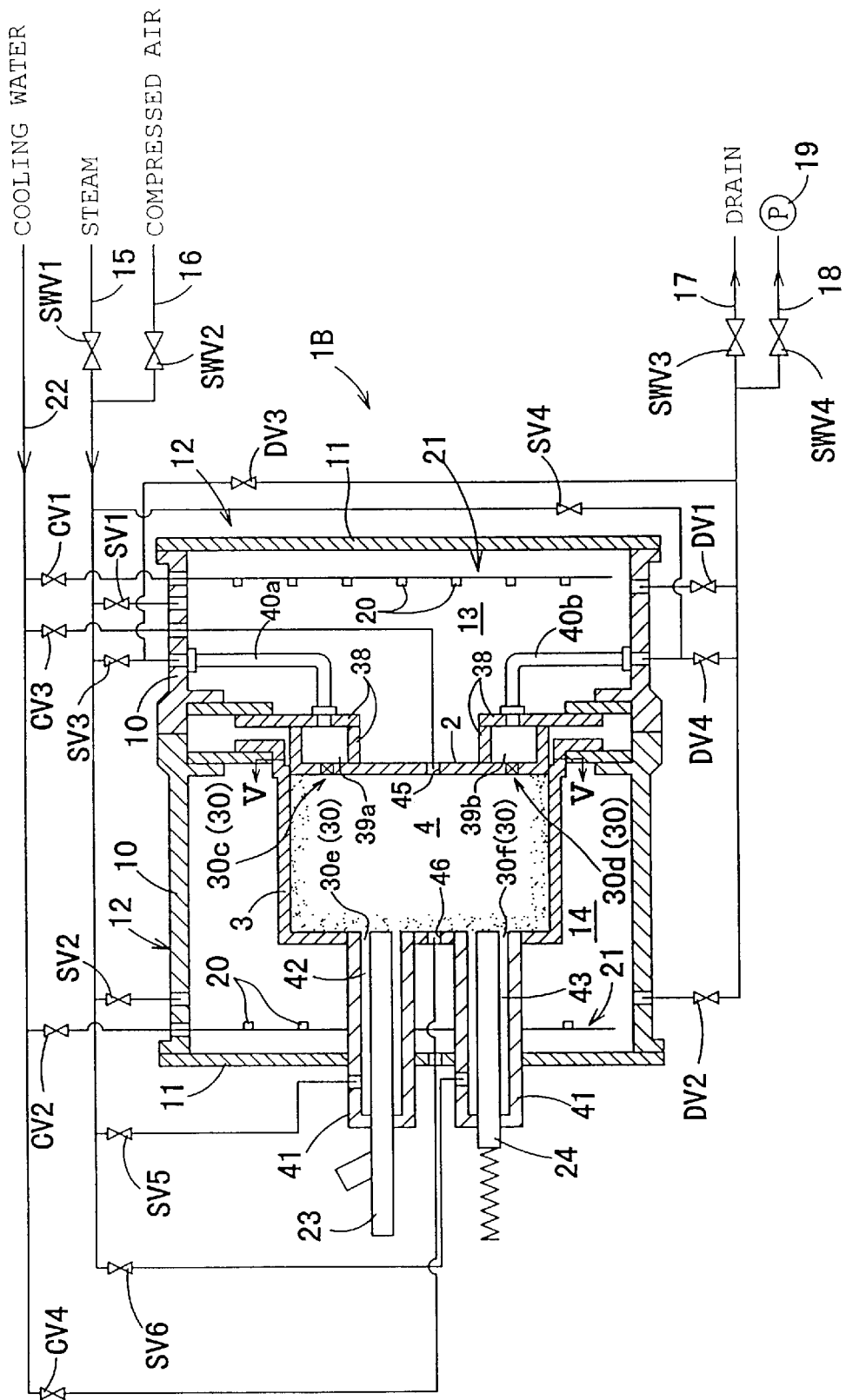
FIG. 4 is a schematic illustration of another in-mold foam molding apparatus in its entirety.
Figure 5:
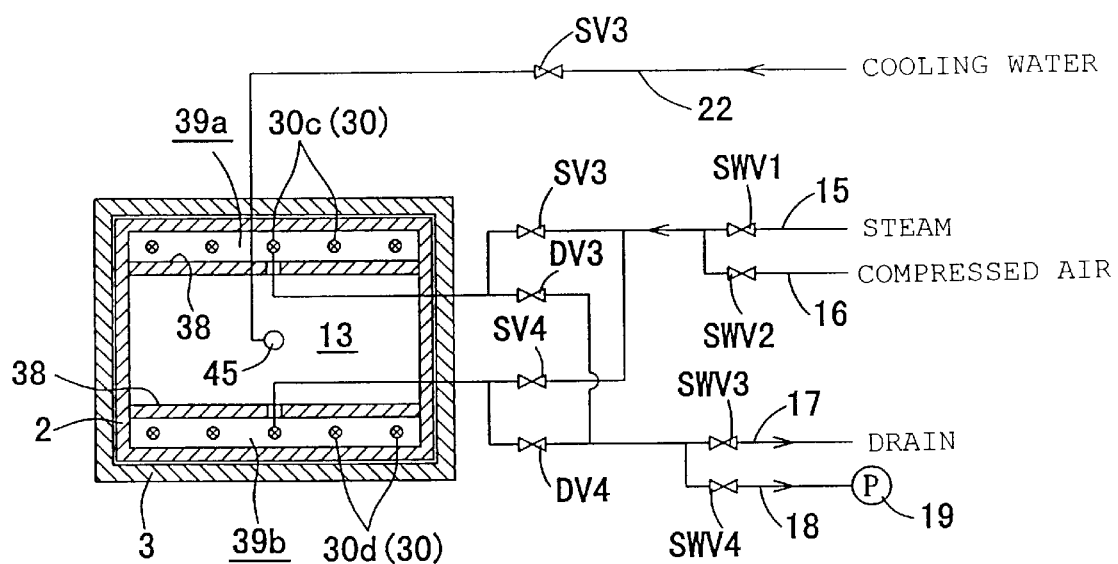
FIG. 5 is a sectional view taken along line V–V in FIG. 4.

(3) Referring to FIGS. 4 and 5, in-mold foam molding apparatus 1B of a third type has first openings 30c, 30d, provided to core mold 2, situated in proximity to the parting line of core mold 2 and cavity mold 3 and communicating with the interior of the mold cavity 4. First openings 30c, 30d communicate with external service lines 15–18 via communicating passages composed of communicating spaces 39a, 39b defined by passage defining members 38 secured to the inside of core mold 2 so as to enclose first openings 30c, 30d, and internal lines 40a, 40b via which communicating spaces 39a, 39b communicate with external service lines 15–18. Via communicating spaces 39a, 39b and internal lines 40a, 40b working fluids may be individually supplied to or vented from the first openings 30c, 30d. Other elements are identical to those in the in-mold foam molding apparatus 1 described earlier, and as such are assigned the same symbols and not described in any detail.

In this in-mold foam molding apparatus 1B, molds 2, 3 are devoid of conventional air orifices such as core vents and core vent holes connecting mold cavity 4 with chambers 13, 14, being designed such that when the molds are closed, the mold cavity 4 is isolated in gas-tight fashion from chambers 13, 14, while first openings 30c, 30d and the communicating passages via which these first openings 30c, 30d communicate with service lines 15–18, namely, communicating spaces 39a, 39b and internal lines 40a, 40, are arranged in a different configuration than in the preceding two cases.

First openings 30c, 30d may take the form of through-holes or slits made directly in core mold 2; however, since it is conceivable that the inside faces could experience wear due to the passage of steam, in preferred practice core vent mounting holes will be made for first openings 30c, 30d and detachable core vents will be installed therein, as in conventional molding apparatuses.

In the foam molding apparatus 1B depicted in FIGS. 4 and 5, as in in-mold foam molding apparatus 1, service fluids can be controlled during foam molding, thereby affording advantages [5] and [6] listed earlier. Since core vents connecting mold cavity 4 and communicating spaces 39a, 39b are provided, this arrangement has a number of disadvantages relative to advantages [1] to [4] listed earlier, but since core vents and core vent holes need not be produced uniformly over the entire face of the mold, the number of core vents can be reduced appreciably. Further, measures to prevent wear of first openings 30c, 30d by steam can be readily taken, providing a more practical design. In this foam molding apparatus 1B of the third type, the mold cavity can be formed between the parting line of the left and right rim-like frames 10, as in the foam molding apparatus 1A of the second type, and internal lines 32a, 32b dispensed with.

In the case depicted in FIG. 4, first openings 30c, 30d are provided to the core mold 2; however, where the inside face (core mold 2 side) of the molded article will be facing outward, it is preferable in terms of the appearance of the molded article to locate the first openings 30c, 30d in the cavity mold 3.

Next, a case wherein first openings 30 are situated in proximity to peripheral components such as a filling unit 23 or ejector pin 24 is described.

Where first openings 30 are to be situated in proximity to peripheral components as shown in FIGS. 1, 3, and 4, housing members 41 of approximately tubular configuration are attached to cavity mold 3 at locations corresponding to filling unit 23 and ejector pin 24, and filling unit 23 and ejector pin 24 are accommodated fitting within these housing members 41. Communicating passages 42, 43 communicating individually with service lines 15–18 are formed between filling unit 23/ejector pin 24 and the housing members 41, first openings 30e, 30f that open into mold cavity 4 are formed at the distal ends of communicating passages 42, 43, and communicating passages 42, 43 are coupled to service lines 15–18 via service valves SV5, SV6 so that, as with first openings 30a –30d described previously, operations such as steam or pressurized air delivery or pressure reduction may be carried out.

With this arrangement, objects of the invention may be achieved in a configuration provided with first openings 30e, 30f alone, without concomitantly providing the first openings 30a-30d described previously. In preferred practice, however, the first openings 30a –30d described previously will be provided concomitantly.

First openings 30e, 30f situated in proximity to the distal ends of filling unit 23 and ejector pin 24 may be provided concomitantly with the first openings 30a –30d described previously in the manner shown in FIGS. 1, 3, and 4, in order to provide individual passages leading from each of the first openings 30 to external service lines 15–18. With this arrangement, first openings 30 capable of delivering service fluids are provided at a minimum of three locations: two opposing end portions of mold cavity 4, and the central portion of mold cavity 4, whereby service fluids may be delivered in a manner appropriate for the quality required, and there is afforded a greater degree of freedom in control operations such as service fluid feed or stop, so that service operations may be optimized with reference to foam molding type, configuration, and other factors.

In the case shown in FIGS. 1, 3, and 4, first openings 30e, 30f are situated in proximity to the distal ends of filling unit 23 and ejector pin 24, but the invention is not limited to this configuration, it being alternatively possible to use other peripheral components attached to the mold, such as cooling water line fixtures and the like. Given an arrangement wherein steam can move uniformly through all of the prefoamed beads in the mold cavity 4, there is no need to provide any communicating passages 42, 43 to the outside of filling unit 23 and ejector pin 24, and first opening 30e, 30f, or both may be dispensed with, providing first openings 30e, 30f only where appropriate for the configuration of the molded article being molded. Alternatively, first openings 30a –30d may be employed exclusively for venting of steam supplied to mold cavity 4 via first openings 30e, 30f. In FIGS. 1, 3, and 4, filling unit 23 and ejector pin 24 are shown provided to the cavity mold 3; however, where the outside face (cavity mold 3 side) of the molded article will be exposed to the outside, it is preferable in terms of the appearance of the molded article to situate the filling unit 23 and ejector pin 24 on the core mold 2.

The second feature of the in-mold foam molding apparatus of the invention resides in the provision of second cooling means for injecting cooling water into mold cavity 4 during cooling of the molded article, so that the molded article is cooled directly by cooling water.

The second cooling means is now described making reference to FIGS. 1–5. Core mold 2 and cavity mold 3 are provided with cooling water orifices 45, 46, these cooling water orifices 45, 46 being coupled to a cooling water feed line 22 via cooling valves CV3, CV4, respectively. During the cooling process following heating and fusing of the prefoamed beads with steam, cooling water is sprayed onto the back faces of molds 2, 3 by the first cooling means described earlier, thereby cooling the molded article indirectly via molds 2, 3. Cooling water is also pressure-injected into the mold cavity 4 by the second cooling means so that the molded article can be cooled directly by cooling water. The second cooling means and the first cooling means may be hooked up to separate cooling water feed lines. Where it is important for molded articles to be uncontaminated, the quality of the cooling water supplied to the second cooling means must be controlled since this water comes into direct contact with the molded article; however, the cooling water supplied to the first cooling means does not need to be contaminant-free since it does not come into direct contact with the molded article. Accordingly, the costs associated with water treatment can be reduced by controlling the quality of only the cooling water delivered to the first cooling means.

Cooling water orifices 45, 46 may be of any desired configuration, such as a round, long narrow slit, or oval configuration. While the locations for cooling water orifices 45, 46 may be selected arbitrarily, the layout should be such that the molded article is cooled in a balanced manner throughout. The number of orifices may also be selected arbitrary, but since too great a number will eliminate the advantages afforded by eliminating core vents, core vent holes, and other such air orifices, in preferred practice the number will be held to a minimum, as will the aperture area, for the same reason. Specifically, while the number of cooling water orifices will depend on molding configuration and molding size, numbers ranging from 0.5 to 1.5 orifices per 100 $cm^2$ of surface area on both the convex and concave mold are preferred. In preferred practice, aperture area per cooling water hole will be 0.05 $cm^2$ (since it is about the same as a drill bit) to 2.00 $cm^2$ (since it is about the same as a core vent).

Where cooling water pressure is below foamed resin pressure during the cooling water spraying process, the water pressure will be overcome by the resin pressure, making spraying impossible. It must therefore be kept above foamed resin temperature. Above 0.5 MPa (the withstand pressure of the polypropylene molding apparatus), the molding apparatus and molded article may be damaged, so pressure should be kept below this level.

Figure 6:
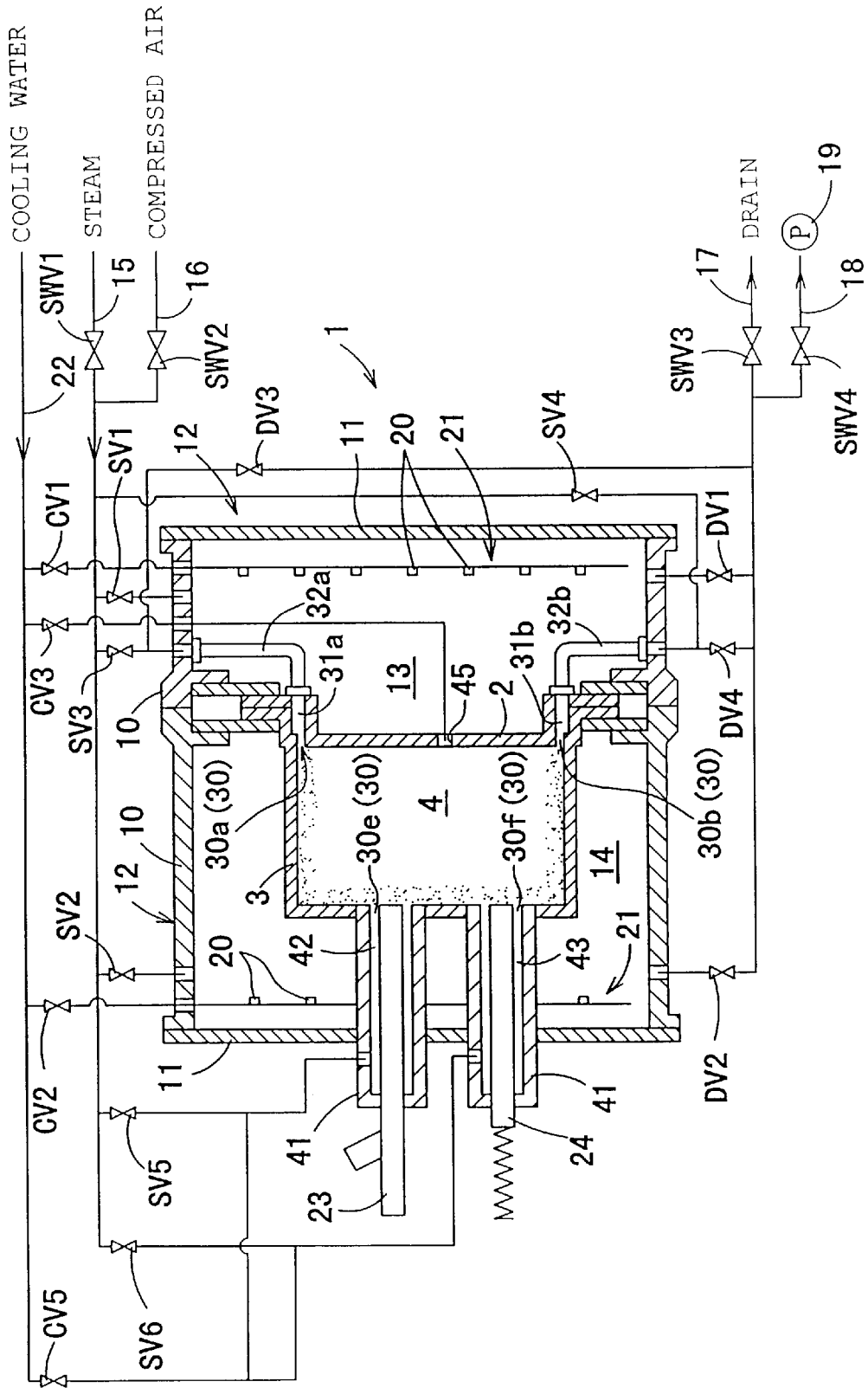
FIG. 6 is a schematic illustration of another in-mold foam molding apparatus in its entirety.

Molds 2, 3 may be provided with independent cooling water orifices 45, 46, or, alternatively, first openings 30e, 30f may be employed as cooling water orifices, as shown in FIG. 6. With this arrangement, communicating passages 42, 43 communicate with the cooling water feed line 22 via a service valve CV5; service valve CV5 is opened when the molded article is to be cooled so that cooling water is supplied to mold cavity 4 through first openings 30e, 30f. Where no communicating passage 42 is provided around the filling unit 23 used for introducing the prefoamed beads, an internal passage (not shown) provided to filling unit 23 may be used to deliver cooling water to mold cavity 4.

The timing for spraying of cooling water by the second cooling means should be slightly delayed relative to the timing for spraying of cooling water by the first cooling means specifically, once steam heating of the prefoamed beads is completed, drain valves DV3, DV4 are opened and the mold cavity 4 is brought to atmospheric pressure. The first cooling means is operated simultaneously with mold cavity 4 being brought to atmospheric pressure, and the second cooling means is operated at predetermined time interval after mold cavity 4 has been brought to atmospheric pressure, once the prefoamed beads have sufficiently expanded. That is, with the first cooling means, the molded article is cooled via molds 2, 3 by spraying cooling water on the back faces of molds 2, 3, and it takes some time for molds 2, 3 to cool. Thus, simply spraying cooling water once the prefoamed beads have sufficiently expanded does not produce rapid cooling, so cooling time will be prolonged. With the second cooling means, on the other hand, the molded article is cooled directly with cooling water delivered to the mold cavity 4, so if the cooling water is delivered into the mold cavity 4 at the same time that the mold cavity 4 is brought to atmospheric pressure, the molded article will cool before the prefoamed beads have sufficiently expanded, resulting in an uneven surface on the molded article. Accordingly, in order to reduce cooling time while assuring high molding quality, the first cooling means should be operated promptly upon conclusion of the prefoamed bead heating process, and the second cooling means should be operated a predetermined time after the first cooling means.

Tests for determining operation timing for the second cooling means are now described.

Molding Conditions

Prefoamed beads
  polypropylene resin beads
  average expansion factor: 15
  melting point: approximately 145 ° C.
  melt flow rate: approximately 5.5 g/10 min
  granule weight: approximately 1.8 mg
Molded article
  W 200 mm×H 500 mm×D 100 mm panels
  average expansion factor 11
Molding apparatus
  max. steam pressure: 0.343 MPa (constant)
  cooling water temperature: 30–40 ° C.
  cooling water pressure: approximately 0.392 MPa condition for terminating cooling: point at which
  foamed resin pressure reaches 0.049 MPa (constant)

Figure 7:
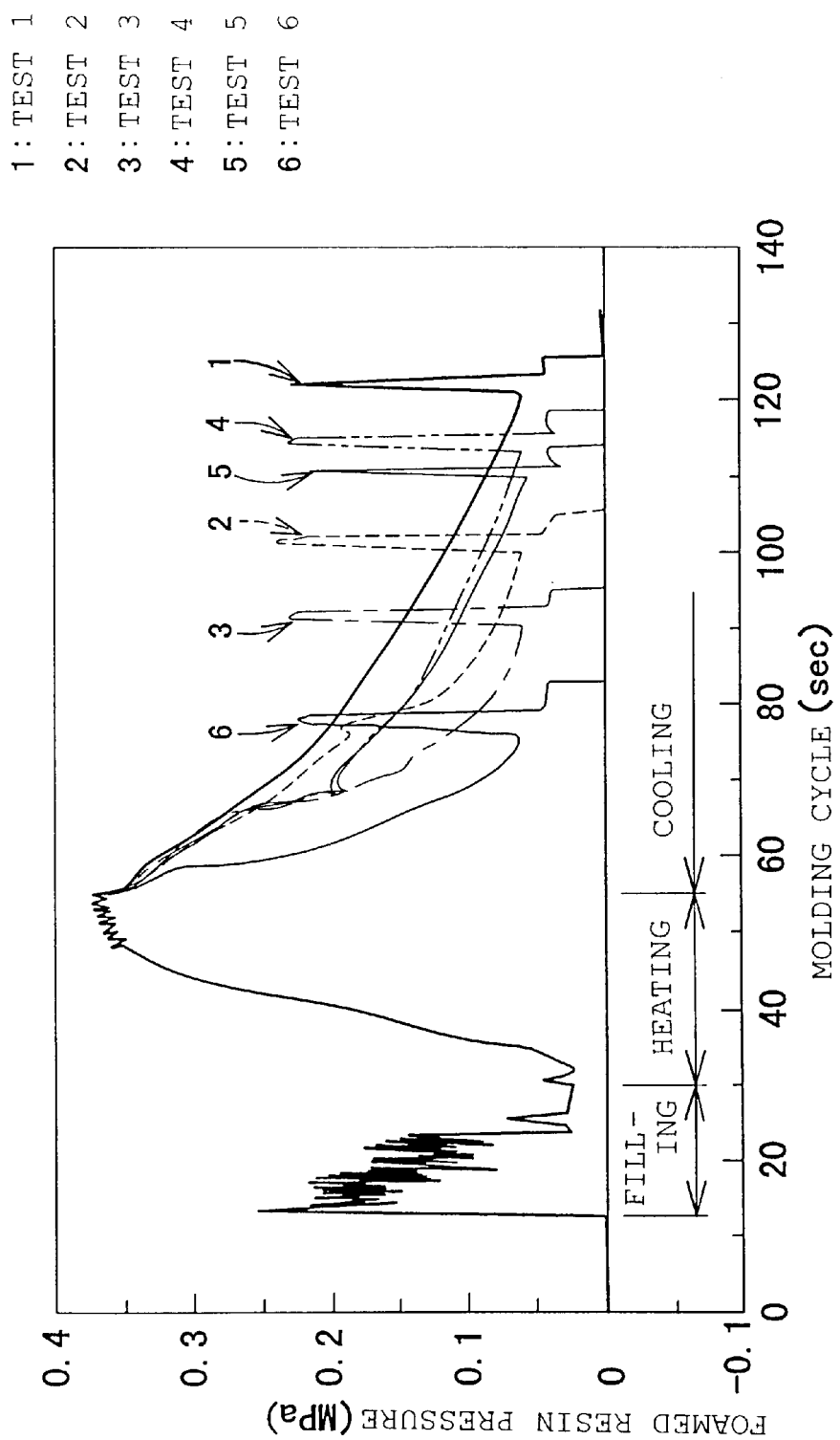
FIG. 7 is a graph showing the relationship of molding cycle and foamed resin bearing pressure.

Under the molding parameters given above, a mold cavity 4 was filled with prefoamed beads. The prefoamed beads were heated and fused with steam, and the first cooling means was then operated to spray cooling water onto the back faces of the molds until foamed resin pressure reached 0.049 MPa while varying the control pattern for the second cooling means in the manner indicated in TABLE 2 to produce six different types of molded article. To describe the cooling method more specifically, in Test 1, the molded article was cooled using the first cooling means only; in Test 2, the second cooling means was operated for 5 seconds after a 20-second delay time from operation of the first cooling means; in Test 3, the second cooling means was operated for 5 seconds after a 10-second delay time from operation of the first cooling means; in Test 4, the second cooling means was operated for 2 seconds after a 10-second delay time from operation of the first cooling means; in Test 5, the second cooling means was operated for 2 seconds after a 10-second delay time from operation of the first cooling means, and the mold cavity was then evacuated; and in Test 6, the first cooling means and the second cooling means were operated simultaneously for 5 seconds. The molding cycle time from the outset of the prefoamed bead filling process to completion of the cooling process was measured, giving the results indicated in TABLE 2. FIG. 7 shows the relationship of molding time and foamed resin bearing pressure.

TABLE 1

| | SECOND COOLING MEANS OPERATION DELAY TIME (sec.) | SECOND COOLING MEANS OPERATION TIME (sec.) | MOLDING CYCLE TIME (sec.) | MOLDING QUALTIY |
|---|---|---|---|---|
| TEST 1 | — | — | 130 | GOOD |
| TEST 2 | 20 | 5 | 110 | GOOD |
| TEST 3 | 10 | 5 | 100 | GOOD |
| TEST 4 | 10 | 2 | 125 | GOOD |
| TEST 5 | 10 | 2 MOLD CAVITY EVACUATED AFTER WATER INJECTION | 115 | GOOD, NO WETTING OF MOLDING |
| TEST 6 | 0 | 5 | 85 | SOMEWHAT POOR, IRREGULAR HEIGHT ON PORTIONS OF SUFACE |

As will be apparent from TABLE 1 and FIG. 7, Tests 2 to 6, which employed both first cooling means and second cooling means, had shorter cooling time and shorter molding cycle time overall than did Test 1, which employed first cooling means only. Where both first cooling means and second cooling means were employed, simultaneous operation of the two cooling means after the prefoamed beads were heated with steam, as in Test 6, produced an uneven surface on the molded article, resulting in diminished quality of the molded article. Where the second cooling means was operated after a 20-second delay time from operation of the first cooling means, as in Test 2, the reduction in molding cycle time was about 5 seconds relative to Test 1, in which only the first cooling means was employed for cooling; since the advantages of providing second cooling means are not fully realized in this case, the delay time will preferably be about 10 seconds, as in Tests 3 to 5. The cooling water spray time for the second cooling means is preferably about 5 seconds, since 2 seconds proves to be too short, as shown by Test 4. It is desirable to evacuate the mold cavity after water is supplied thereto by the second cooling means, as this dries the surface of the molded article.

From the above results it will be apparent that optimal operation delay time for the second cooling means is from about 5 to 20 seconds relative to the first cooling means, and that optimal operation time for the second cooling means is from about 2 to 10 seconds. It should noted however that operation delay time and operation time will vary somewhat with the size and configuration of the molded article, and should be selected appropriately with reference to the configuration and size of the molded article. Specifically, operation delay time for the second cooling means relative to the first cooling means is from 2 to 30 seconds and preferably 5 to 20 seconds, while operation time for the second cooling means is from 2 to 30 seconds and preferably 2 to 10 seconds. In preferred practice, operating time for the second cooling means will be equivalent to 3 to 50%, and preferably 5 to 20%, of operating time for the first cooling means.

Since molding defects may be avoided by allowing the prefoamed beads to sufficiently expand before operating the second cooling means, the mold is provided with a bearing pressure sensor for measuring foamed resin bearing pressure against the molds. The second cooling means may be operated when the foamed resin pressure after commencing operation of the first cooling means reaches a level equivalent 0.50 to 0.95 times, and preferably 0.6 to 0.8 times, the foamed resin pressure observed at the conclusion of heating.

In the present example, cooling water orifices 45, 46 have been provided to increase the efficiency of cooling of the molded article, but may be designed such that cooling water orifices 45, 46 are used to improve mold release of the molded article as well. For example, where cooling water orifice 45 is coupled to an air feed line 16 via a control valve (not shown) and a switching valve SWV2, and cooling water orifice 46 is coupled to a pressure reduction line 18 via a control valve (not shown) and a switching valve SWV4, opening both control valves when molds 2, 3 are parted causes pressurized air to be delivered through cooling water orifice 45, which releases the molded article from the core mold 2, while cooling water orifice 46 is depressurized so that the molded article is held onto the cavity mold 3, whereby the molded article remains on the cavity mold 3. In other words, the molded article may be induced to remain on a desired mold by creating a pressure differential between the core mold 2 and the cavity mold 3. When releasing the molded article from the cavity mold 3, pressurized air can be delivered to cooling water orifice 46 to assist in the mold release operation by the ejector pin 24.

The third feature of the in-mold foam molding apparatus of the invention resides in the provision of a bearing pressure sensor for making serial measurements of foamed resin pressure against the molds 2, 3, in order to reduce the cooling time by releasing the molded article from the mold while still soft, but not so soft as to break, on the basis of the measured foamed resin pressure; and in setting the released molded article in a fixture in order to stabilize the shape and dimensions thereof outside of the molds 2, 3.

The bearing pressure sensor used to determine cooling timing, described earlier, may also function as the bearing pressure sensor for this purpose. Where a plurality of bearing pressure sensors are provided, each mold chamber may be provided with a corresponding sensor, and the timing for mold release established using an average value for the plurality of bearing pressure sensors. Alternatively, the molds may be provided with a single bearing pressure sensor, and the timing for mold release established based on the output of this single bearing pressure sensor.

Figure 8:
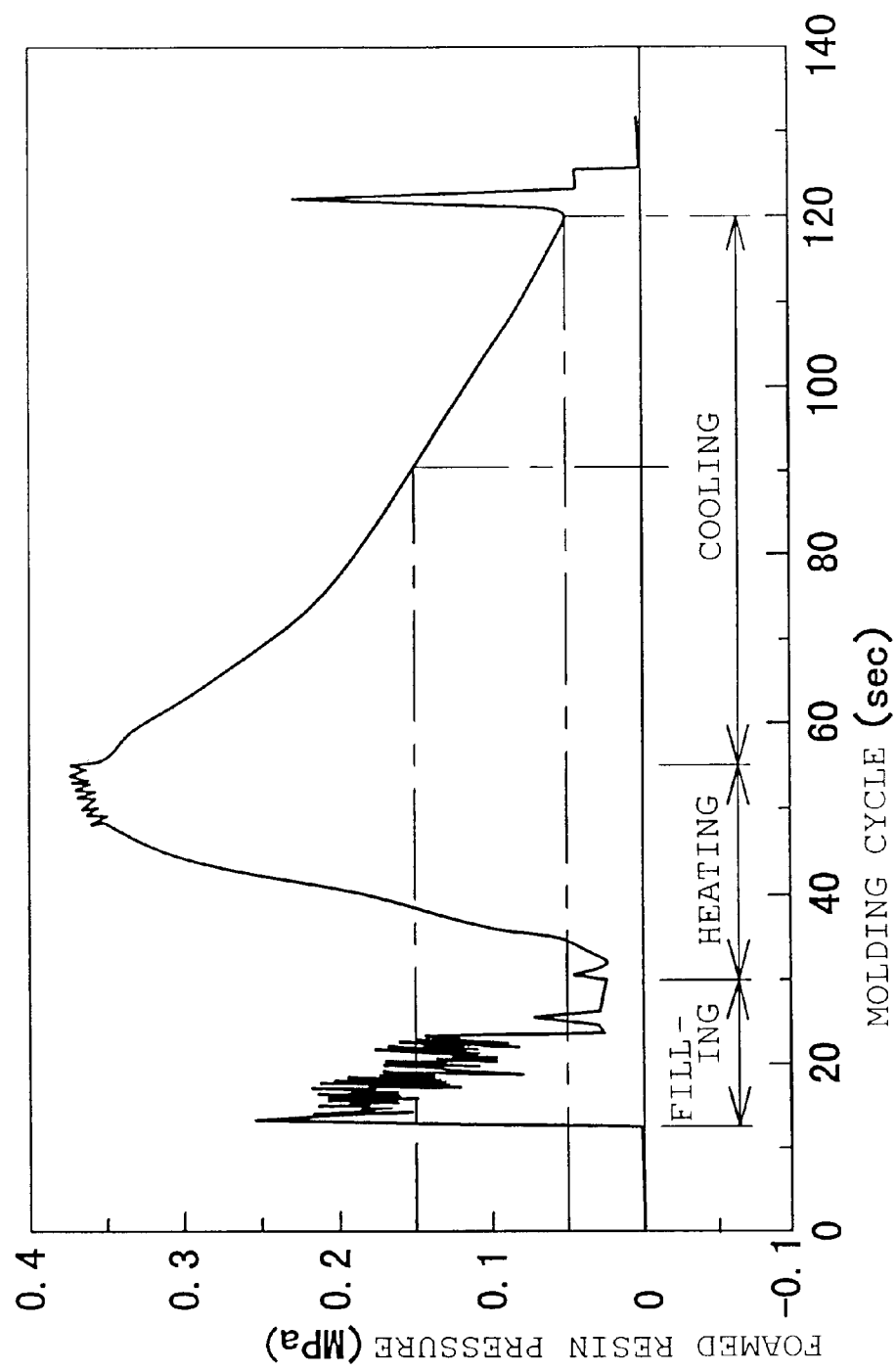
FIG. 8 is a graph showing the relationship of molding cycle and foamed resin bearing pressure.

Specifically, the timing for mold release is when foamed resin pressure against the molds is within the range 0.02–0.2 MPa, and preferably 0.03–0.15 MPa, so that the molded article is suitably hard when released. Foamed resin pressure fluctuates in the manner shown in FIG. 8 during cooling. Where resin pressure is below 0.02 MPa, cooling time will be prolonged. Above 0.2 MPa the molded article will not cool sufficiently, and if the molded article is released while excessively soft, the molded article may break or suffer reduced dimensional accuracy. Accordingly, the range 0.02–0.2 MPa is preferred. By setting the timing for mold release with reference to foamed resin pressure in this way, where mold release is conducted when foamed resin pressure is 0.15 MPa, cooling time can be reduced by about half compared to the case where mold release takes place at about 0.05 MPa, as shown in FIG. 8. Even where there is deviation in foamed resin pressure during heating time, mold release can be always be carried out at a constant foam pressure, whereby dimensional stability of molded articles can be improved.

In the present invention, the released molded article is set in a fixture in order to stabilize the shape and dimensions of the soft molded article while outside of the mold. As used herein, fixture refers to a curing frame for stabilizing the shape and dimensions of molded articles. While not illustrated in the present example, the fixture used has an engaging portion for engaging the molded article in such a way to ensure accurate dimensions of the molded article, at least in a standard location on the molded article (e.g., in a core for a car bumper, the dimensions of the molded article at the location at which the core is mounted to the front beam). The molded article is set therein to stabilize the shape and dimensions of the molded article. The configuration of fixture is arbitrary and may be selected with reference to the shape of the molded article. By setting the molded article in a fixture, it is possible to dimension the molded article highly accurately.

The time for which a molded article is set in the fixture will depend on factors such as molding size and the material of the prefoamed beads, and may be selected as appropriate within the range of from 5 to 60 minutes, which give adequate stabilization of shape.

Specifically, in the case of molded article of a core for a car bumper under the molding conditions given in TABLE 2, it will be apparent that the timing for mold release in the example is sooner, the cooling time is shorter, and the molding cycle time is shorter than in the comparative example. Further, it will be apparent that despite the fact that curing time in the fixture is the same in the example and the comparative example, the example affords molded articles of good quality with less deviation in molding dimensions than in the comparative example, because mold release is always be carried out at a constant foam pressure. In this example, the molding apparatus is devoid of air orifices, and cooling of the molded article is carried out exclusively by spraying cooling water onto the back faces of molds 2, 3 using the first cooling means, thus obviating the need for drying of the molded article after release from the mold. The comparative example, however, employs a conventional molding apparatus, so a 5-hour drying process is required after mold release. In this example, it is possible to shorten the molding cycle further by employing a second cooling means as well to cool the molded article directly with cooling water. By controlling the supply of cooling water from the second cooling means in the manner described earlier, it becomes possible to dispense with the drying operation after mold release.

TABLE 2

|  | COMPARATIVE EXAMPLE | EXAMPLE |
| --- | --- | --- |
| CONFIGURATION OF MOLDED ARTICLE | BUMPER CORE LENGTH: 1160 mm, WIDTH: 150 mm, THICKNESS: 110 mm, VOLUME: 0.0125 m$^3$ | |
| MATERIAL USED | POLYPROPYLENE PREFOAMED BEADS, BULK DENSITY: 50 kg/m$^3$ | |
| FILLING CONDITIONS | SET SO THAT MOLDING EXPANSION FACTOR IS ABOUT 11 | |
| HEATING CONDITIONS (MAX. STEAM PRESSURE) | 0.343 MPa | |
| COOLING WATER TEMPERATURE | 30–40° C. (WATER PRESSURE 0.49 MPa) | |
| MOLD RELEASE CONDITIONS | TIMER 120 SECONDS | MOLD RELEASE BEARING PRESSURE 0.098 MPa |
| FIXTURE CURING | 15 MINUTES | 15 MINUTES |
| DRYING | 5 HOURS | NONE |
| MOLDING CYCLE | 180 SECONDS | 120 SECONDS |
| DIMENSION DEVIATION (3σ) mm | | |
| LENGTH | 4.0 mm | 1.90 mm |
| WIDTH | 1.6 mm | 0.82 mm |
| THICKNESS | 1.8 min | 0.69 mm |

Figure 9:
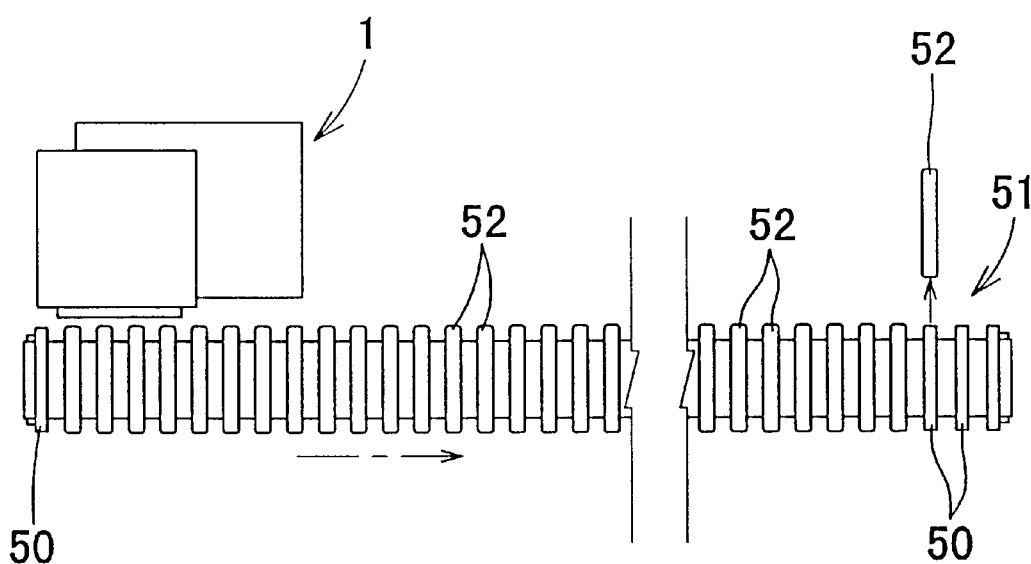
FIG. 9 is a plan view of an entire molding system.

A preferred design for a molding system furnished with this equipment is depicted in FIG. 9, wherein a plurality of fixtures 50 are arranged on a conveyor 51 to the side of a molding apparatus 1, the fixtures 50 being cyclically delivered to the molding apparatus by means of conveyor 51 so that the molded articles 52 molded by the molding apparatus 1 may be set in fixtures 50 in serial fashion, whereby the shape and dimensions of molded articles 52 can be stabilized.

The molding method employing the foam molding apparatus i depicted in FIG. 1 is now described.

This molding method is divided into the following four steps: a filling step for filling the mold cavity 4 with prefoamed beads; a heating step for heating, foaming, and fusing the prefoamed beads filling the mold cavity 4; a cooling step for cooling the molded article; and a fixture curing step for stabilizing the shape and dimensions of the released mold ed article.

The prefoamed beads filling step is described first.

In this step, the core mold 2 and cavity mold 3 are closed, drain valves DV3, DV4 are opened, and prefoamed beads, carried on a stream of air, are delivered from filling unit 23 to mold cavity 4 while at the same time venting the air entering mold cavity 4 from the mold cavity 4 via first openings 30a, 30b as the mold cavity 4 is filled with prefoamed beads. The prefoamed beads may consist of so-called Inclusion beads, produced by injecting air at pressure above atmospheric pressure to provide foaming power prior to molding.

Specific filling methods include cracked filling, pressure filling, and compression filling, described below.

[1] In the cracked filling method, during filling, the core mold 2 and the cavity mold 3 are not completely closed (i.e., cracking), so as to leave a gap equal to about 10% of the bottom wall thickness of the molded article, for example. As the prefoamed beads are packed in, the air used for filling is vented through the gap between the core mold 2 and the cavity mold 3.

[2] In the pressure filling method, the interior of a starting material tank housing the prefoamed beads is pressurized to about 0.02–0.15 MPa, and the mold cavity 4 is brought to atmospheric pressure. Utilizing this pressure differential between the starting material tank and the mold cavity 4, the prefoamed beads are transported to and packed into the mold cavity 4.

[3] In the compression filling method, the pressure p in a starting material tank is increased to a higher level than with the pressure filling method, namely, about 0.01–0.5 MPa, and while maintaining a pressure differential (p–p1) with respect to the internal pressure p1 within the mold cavity 4, the bead starting materials are transported and packed.

The process of heating with steam the prefoamed beads filling the mold cavity 4 is now described.

First, with drain valves DV1, DV2 open, service valves SV1, SV2 are opened to cause steam to flow into chambers 13, 14 so that air present in chambers 13, 14 is replaced with steam. This step may be conducted during the filling step.

Next, drain valves DV1, DV2 are shut, and while controlling service valves SV1, SV2 in such a way that chambers 13, 14 reach a predetermined steam pressure, steam is supplied to chambers 13, 14 for a heating period of predetermined length to heat the core mold 2 and cavity mold 3, thereby expanding and fusing the prefoamed beads contacting the core mold 2 and cavity mold 3 so as to form a skin on the molded article.

The steps of heating the bead starting materials filling the mold cavity 4 can be conducted in parallel; however, the steps can be broadly divided into three.

In the first step, drain valve DV4 is opened, drain valve DV3 is closed, service valves SV3, SV5, and SV6 are opened, and service valve SV4 is closed to create a flow of steam through the mold cavity 4 so that air present between prefoamed beads is replaced with steam.

In the second step, in the reverse of the first step, drain valve DV4 is closed, drain valve DV3 is opened, service valve SV3 is closed, and service valves SV4, SV5, and SV6 are opened to create a flow of steam through the mold cavity 4 so that air present between the prefoamed beads is replaced with steam. This second step may be omitted.

In the third step, drain valves DV3, DV4 are closed, and while controlling service valves SV3–SV6 in such a way that mold cavity 4 reaches a predetermined steam pressure, steam is supplied to mold cavity 4 for a heating period of predetermined length to heat, expand, and fuse the prefoamed beads to form the interior of the molded article.

The steam supplied to chambers 13, 14 and the steam supplied to mold cavity 4 allow the surface portions of the molded article and the interior of the molded article to be heated independently, thereby allowing the surface qualities of the molded article and fusion of the molded article interior to be controlled separately.

In the subsequent cooling step, cooling water valves CV1, CV2 are opened and cooling water is sprayed onto core mold 2 and cavity mold 3 from nozzles 20 to cool the molded article in the mold cavity 4 via the core mold 2 and cavity mold 3. Following initial operation of the first cooling means, after the predetermined delay time described earlier, cooling water valves CV3, CV4, and CV5 of the second cooling means are opened for a given time interval so that the molded article is cooled directly by cooling water injected into mold cavity 4 from cooling water orifices 45, 46. In the design depicted in FIG. 6, cooling water valve CV5 and cooling water valves CV3 and CV4 are controlled in the same manner.

In this cooling process, bearing pressure of the foamed resin pressure is measured successively by means of a bearing pressure sensor, and when foamed resin pressure reaches 0.02–0.2 MPa, cooling of the molded article is halted. Here, cooling is concluded relatively early on, so the molded article, while being hard enough to avoid breaking, is softer than molded articles produced by conventional molding processes.

In the subsequent fixture curing process, the molds 2, 3 are parted and the relatively soft molded article is released by the ejector pin 24. The released molded article is set in the fixture and cured for 5 to 60 minutes to stabilize the shape and dimensions of the molded article outside of the molds 2, 3.

Figure 10:
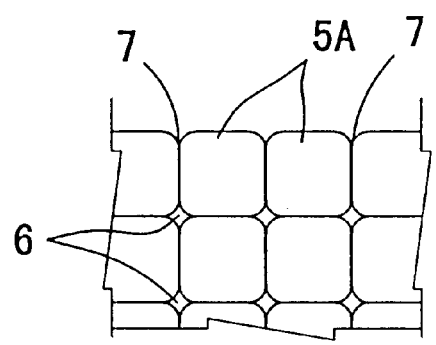
FIGS. 10($a$) and 10($b$) are illustrative diagrams of surface properties and internal rate of fusion in molded articles.
Figure 10:
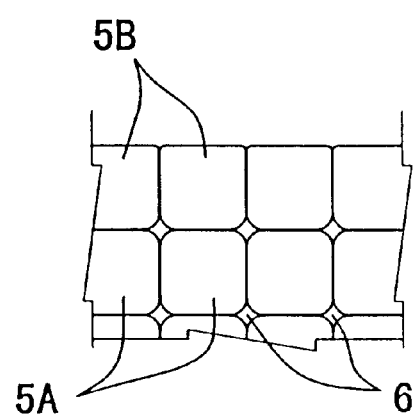

Molded articles produced in this way have attractive surfaces free of markings caused on exterior surfaces by core vents and core vent holes. Surface qualities may be maintained at levels equivalent to those of isothermal molded articles produced by conventional molding techniques while at the same time manipulating the extent of fusion in the interior to a lower or higher level than in an isothermal molded article of the same given surface qualities. That is, with conventional molding methods, when prefoamed beads are heated, expanded and fused, since the surfaces and interior of the prefoamed beads are heated under identical heating conditions, lowering the extent of fusion in the interior of molded article has the result of gaps forming at bead interfaces 5A and depressions 7 forming on the surface of the molded article, as shown in FIG. 10(*a*). With the molding method of the present invention, however, the surface and interior can be heated independently, so while gaps 6 do form at bead interfaces 5A, the bead interfaces 5B situated at the surface of the molded article are substantially devoid of depressions 7, as shown in FIG. 10(*b*), affording a molded article with a smooth and attractive surface. A low extent of fusion in the interior of a molded article is suitable in cases where there are rather stringent requirements as regards surface qualities, but no need for high mechanical strength, as with decorative frames for fill-up concrete block surfaces, container lids, or heat insulation materials, whereas a high extent of fusion of the interior of a molded article is suitable in cases where requirements as regards surface qualities are not particularly stringent, but there is a need for high mechanical strength or ability to withstand repeated use, as with automotive parts and goods-delivery boxes. The invention is according more advantageous and useful for molded articles of relatively large size and complex shape than for small molded article of simple shape, such as an instant noodle container. It is particularly suited to production of molded articles having length of 1000 mm or greater and deviation (3 σ) in length of no more than 0.2%, such as molded articles of considerable extension that nonetheless must have accurate dimensions, like a core for a car bumper, for example.

According to the polyolefin synthetic resin in-mold foam molding method of the first phase of the present invention, the molded article released from the mold is set in a fixture and held therein for a predetermined time interval, whereby the shape and dimensions of the molded article may be stabilized, thereby assuring adequate dimensional stability of the molded article while at the same time reducing cooling time, since the molded article is released from the mold while still soft but not soft enough to break. Molding throughput is improved as a result. Further, the timing for mold release is determined on the basis of serial measurement of foamed resin pressure against the molds, whereby mold release can always be timed optimally, cooling time can be minimized, and deviation in the dimensions of molded article between shots can be reduced to improve dimensional stability in molded articles.

By terminating cooling of the molded article and releasing the molded article at the point that foamed resin pressure against the molds is within the range 0.02–0.2 MPa, as the second phase of the present invention, breakage and lowered dimensional accuracy of molded articles can be prevented, cooling time can be minimized, and molding throughput can be improved.

Where the setting time of a molded article in a fixture is from 5 to 60 minutes, as the third phase of the present invention, the shape and dimensions of the molded article are adequately stabilized.

By providing a plurality of fixtures which are cyclically delivered to the molding apparatus by means of a conveyor, as the fourth phase of the present invention, the molding process and the molding shape stabilization process may be carried out as a continuous operation.

By employing as molds a core mold and a cavity mold that are devoid of air orifices such as core vents and core vent holes in mold sections that form conspicuous portions on the exterior of a molded article, as the fifth phase of the present invention, marks left on molding surfaces by air orifices will be situated in inconspicuous locations on molding surfaces where they do not detract from the attractiveness of the surface of the molded article. Further, air orifices can be completely or largely dispensed with, whereby it becomes possible to separately control delivery of service fluids to the chamber to the back of the core mold, to the chamber to the back of the cavity mold, and to the mold cavity. Thus, by independently manipulating heating conditions in these three compartments, it is possible, for example, to hold rate of fusion in the interior of a molded article to a low level, reducing molding cycle time while producing a molded article having an attractive surface, thus achieving both good throughput and high product value.

By dispensing completely with air orifices in the two molds, as the sixth phase of the present invention, heating conditions in the three compartments, namely, the chamber to the rear of the core mold, the chamber to the rear of the cavity mold, and the core mold, can be precisely controlled, and molded articles whose surfaces are free from marks produced by air orifices are obtained. The absence of air orifices also prevents cooling water from coming into direct contact with the molded article, thereby allowing the water content of the molded article to be held to a low level, obviating the need for a drying process after mold release, affording uncontaminated molded articles without the need to control cooling water quality, and providing other advantages.

During the process of cooling the molded article, by cooling the molded article indirectly via the molds using first cooling means while cooling the molded article directly with cooling water using second cooling means, as the seventh phase of the present invention, the drop in cooling efficiency associated with the elimination of air orifices from the molds can be prevented. The molded article may be kept uncontaminated simply by controlling the water quality of the cooling water that directly contacts the molded article, i.e., that from the second cooling means, thus appreciably reducing the costs associated with water treatment.

By providing cooling water orifices in proximity to the prefoamed bead filling unit, in proximity to the ejector pin, or both, as the eighth phase of the present invention, marks left on the molded article by the cooling water orifices will be inconspicuous, improving the attractiveness of the molded article.

By spraying cooling water into the mold cavity through cooling water orifices using the second cooling means some 2 to 30 seconds after the first cooling means commences cooling by spraying cooling water, as the ninth phase of the present invention, or by successively measuring the foamed resin pressure of the prefoamed beads against the molds, and when the foamed resin pressure observed subsequent to commencing spraying by the first cooling means reaches a level 0.50 to 0.95 times the foamed resin pressure observed at the conclusion of heating, spraying cooling water into the mold cavity using the second cooling means, as the tenth phase of the present invention, cooling time can be appreciably reduced, and good quality molded articles with attractive surfaces can be produced.

By setting the operating time for the second cooling means to from 2 to 30 seconds, as the eleventh phase of the present invention, or setting the operating time for the second cooling means to the equivalent of 3 to 50% of operating time for the first cooling means, as the twelfth phase of the present invention, adequate cooling efficiency can be assured while preventing molded articles from becoming wet with cooling water, preventing shrinkage of molded articles due to over-cooling, holding down the water content of molded articles, and preventing contamination of molded articles after mold release.

The in-mold foam molded articles of the thirteenth phase of the present invention are molded into the shape of core for a car bumper by the molding method according to any of the first phase to twelfth phase of the present invention, whereby molded articles for use cores for car bumpers, considered difficult to mold conventional methods due to their large size and high accuracy requirements, can be produced without any drop in throughput.

What is claimed is:

1. A polyolefin synthetic resin in-mold foam molding method comprising the steps of:

filling a mold cavity with prefoamed beads comprising a polyolefin synthetic resin;

heating and fusing these with steam; and cooling the molded article;

wherein during the cooling process the pressure of the foamed resin against the molds is successively measured by means of a bearing pressure sensor, and when the pressure of the foamed resin against the molds has reached a pressure preset for the particular molded article, cooling of the molded article is terminated, the molded article is released from the mold, and the molded article is then set in a fixture to stabilize the shape thereof.

2. The polyolefin synthetic resin in-mold foam molding method according to claim 1, wherein the cooling of the molded article is terminated and the molded article is released when foamed resin pressure against the molds is within the range 0.02–0.2 MPa.

3. The polyolefin synthetic resin in-mold foam molding method according to claim 1, wherein the setting time of the molded article in the fixture is set to between 5 and 60 minutes.

4. The polyolefin synthetic resin in-mold foam molding method according to claim 1, wherein a plurality of fixtures are provided, said fixtures being cyclically delivered to the molding apparatus by means of a conveyor.

5. The polyolefin synthetic resin in-mold foam molding method according to claim 1 employing as molds a core mold and a cavity mold that are devoid of air orifices in mold sections that form conspicuous portions on the exterior of molded articles.

6. The polyolefin synthetic resin in-mold foam molding method according to claim 5, wherein the two molds are completely devoid of said air orifices.

7. The polyolefin synthetic resin in-mold foam molding method according to claim 5, wherein during the process of cooling said molded article, cooling water is sprayed onto each of the back faces of the two molds by first cooling means in order to cool the molded article indirectly via the molds; and cooling water from outside the mold is sprayed into the mold cavity by second cooling means from cooling water orifices provided on at least one of the molds, so that the molded article is cooled directly with cooling water.

8. The polyolefin synthetic resin in-mold foam molding method according to claim 7, wherein said cooling water orifices are provided in the proximity to the prefoamed bead filling unit, and/or in the proximity to an ejector pin.

9. The polyolefin synthetic resin in-mold foam molding method according to claim 7, wherein cooling water is sprayed into the mold cavity from cooling water orifices by the second cooling means 2 to 30 seconds after the first cooling means commences cooling by spraying cooling water.

10. The polyolefin synthetic resin in-mold foam molding method according to claim 7, wherein foamed resin pressure against the molds is successively measured, and when the foamed resin pressure observed subsequent to the start of cooling by the first cooling means reaches a level 0.50 to 0.95 times the foamed resin pressure observed at the conclusion of heating, cooling water is sprayed into the mold cavity from cooling water orifices by the second cooling means.

11. The polyolefin synthetic resin in-mold foam molding method according to claim 7, wherein the operating time of the second cooling means is from 2 to 30 seconds.

12. The polyolefin synthetic resin in-mold foam molding method according to claim 7, wherein the operating time of the second cooling means is set to be equivalent to 3 to 50% of operating time of the first cooling means.

13. The polyolefin synthetic resin in-mold foam molding method according to claim 1, wherein said molded article has a length of 1000 mm or greater.

* * * * *